(12) United States Patent
Paulson et al.

(10) Patent No.: US 6,223,828 B1
(45) Date of Patent: May 1, 2001

(54) LANDSCAPE RAKE WITH FLUID CONTROLLED FLOAT CAPABILITY

(75) Inventors: Clint W. Paulson, DeKalb, IL (US); William C. Swick, Raleigh, NC (US)

(73) Assignee: Caterpillar S.A.R.L., Geneva (CH)

(*) Notice: Subject to any disclaimer, the term of this patent is extended or adjusted under 35 U.S.C. 154(b) by 0 days.

(21) Appl. No.: 09/382,380

(22) Filed: Aug. 24, 1999

(51) Int. Cl.⁷ .................................................. A01B 43/00
(52) U.S. Cl. .............................. 171/63; 172/663; 171/110
(58) Field of Search .................................. 171/63, 65, 44, 171/72, 110, 124, 141, 144; 172/663, 664; 60/472, 470, 413

(56) References Cited

U.S. PATENT DOCUMENTS

| | | | |
|---|---|---|---|
| 3,603,404 | * 9/1971 | Whitsed | 171/9 |
| 3,648,447 | * 3/1972 | Burton | 171/92 X |
| 4,113,023 | 9/1978 | Basakett | 171/63 |
| 4,153,114 | * 5/1979 | Morlock | 171/65 |
| 4,319,641 | * 3/1982 | Migdal | 171/63 |
| 4,364,434 | * 12/1982 | Erholm | 171/63 |
| 4,609,049 | * 9/1986 | Migdal | 171/63 |
| 5,060,732 | 10/1991 | Baskett | 171/63 |
| 5,564,506 | 10/1996 | Foster et al. | 171/63 |
| 5,630,476 | 5/1997 | Foster et al. | 171/63 |

* cited by examiner

*Primary Examiner*—Victor Batson
(74) *Attorney, Agent, or Firm*—Haverstock, Garrett & Roberts

(57) ABSTRACT

An improved landscape rake including a rotatably operable rake mechanism for performing a raking function, a bucket for receiving material raked by the rake mechanism, and a fluid actuator connected to the rake mechanism operable for moving the rake mechanism relative to the bucket, the fluid actuator having a first port adapted for connection to a source of pressurized fluid for receiving the pressurized fluid therefrom for moving the rake mechanism to a position proximal to the bucket and a second port adapted for connection via a fluid path to a fluid receiver for discharging fluid thereto, the improvement including a fluid control system for the fluid actuator including a second fluid path connecting the first port of the fluid actuator with the first named fluid path and a valve disposed in the second fluid path operable for allowing fluid flow therethrough from the first port to the first named fluid path while preventing fluid flow from the first named fluid path to the first port to allow the rake mechanism to float when in the position proximal to the bucket.

7 Claims, 2 Drawing Sheets

LANDSCAPE RAKE WITH FLUID CONTROLLED FLOAT CAPABILITY

TECHNICAL FIELD

This invention relates generally to powered landscape rakes, and more particularly, to a powered landscape rake having a fluid or hydraulically controlled float capability for allowing the rake to move responsive to contact with obstructions and surface irregularities such as large rock and the like when in an operative position proximal a bucket for depositing raked material therein, so as to avoid damage to the rake and related structure from such contact.

BACKGROUND ART

Currently, powered landscape rakes adapted for attachment to tractors, skid steer loaders, and other vehicles and work machines for performing ground-raking, rock-gathering, debris removing, site leveling and like functions, are well known. The known landscape rake constructions typically include a rake mechanism having a drum or conveyor including a plurality of teeth, scoops, tines, or other projections for performing the ground-raking, rock-gathering, and debris removing functions, as the drum or conveyor is rotated by a fluid motor or other power source. In operation, the rake mechanism is typically positioned proximal an open end of a bucket adapted for collecting material such as rocks, soil, plant debris and the like picked up by the rake mechanism. To function properly, in the operative position proximal to the bucket, the rake mechanism is also positioned in closely spaced relation to the surface of the ground or other surface to be raked and is moved thereover while performing the ground-raking, rock-gathering or other function. This makes the rake mechanism susceptible to damage from contact with rocks and other objects too large to be raked or collected, surface irregularities, and the like. The known landscape rakes further typically include an actuator such as a fluid cylinder operable using pressurized fluid from the machine for lifting the rake mechanism to allow dumping the contents of the bucket. The cylinder is in an extended position when the rake mechanism is located proximal to the bucket and a spring or other resilient member or device is typically used for maintaining the rake mechanism in the proximal position while allowing some limited movement thereof relative to the bucket and the ground surface for providing a "float" capability wherein the rake mechanism is allowed to be lifted by contact with obstacles such as large rocks, logs, root structures and surface irregularities for passage thereover without damaging the rake mechanism. Reference in this regard landscape rakes available under the trademark ROCKHOUND from Melroe Co. Reference also Erholm U.S. Pat. No. 4,364,434 issued Dec. 21, 1982 entitled Ground-Raking, Rock-Gathering Attachments for Tractors.

However, the known resilient means for providing the float capability are limited to mechanical structures including springs and the like which add expense, are subject to breakage, and require special adaptations to the cylinder or other actuator.

Accordingly, the present invention is directed to overcoming one or more of the problems as set forth above.

DISCLOSURE OF THE INVENTION

In one aspect of the present invention, an improved landscape rake providing a fluid controlled float capability is disclosed. The landscape rake includes a rotatably operable rake mechanism for performing a raking function, a bucket for receiving material raked by the rake mechanism, and a fluid actuator connected to the rake mechanism operable for moving the rake mechanism relative to the bucket, the fluid actuator having a first port adapted for connection to a source of pressurized fluid for receiving the pressurized fluid therefrom for moving the rake mechanism to a position proximal to the bucket and a second port adapted for connection via a fluid path to a fluid receiver for discharging fluid thereto. The improvement includes a fluid control system for the fluid actuator including a second fluid path connecting the first port of the fluid actuator with the first named fluid path and a valve disposed in the second fluid path operable for allowing fluid flow therethrough from the first port to the first named fluid path while preventing fluid flow from the first named fluid path to the first port to allow the rake mechanism to float when in the position proximal to the bucket.

According to another aspect of the invention, the fluid control system includes a fluid accumulator connected in fluid communication with the first port of the fluid actuator to provide cushioning.

According to still another aspect of the invention, a restricted orifice is disposed between the second port of the fluid actuator and the receiver for throttling fluid flow from the second port.

BRIEF DESCRIPTION OF THE DRAWINGS

For a better understanding of the present invention, reference may be made to the accompanying drawings in which.

BEST MODE FOR CARRYING OUT THE INVENTION

Figure 1:
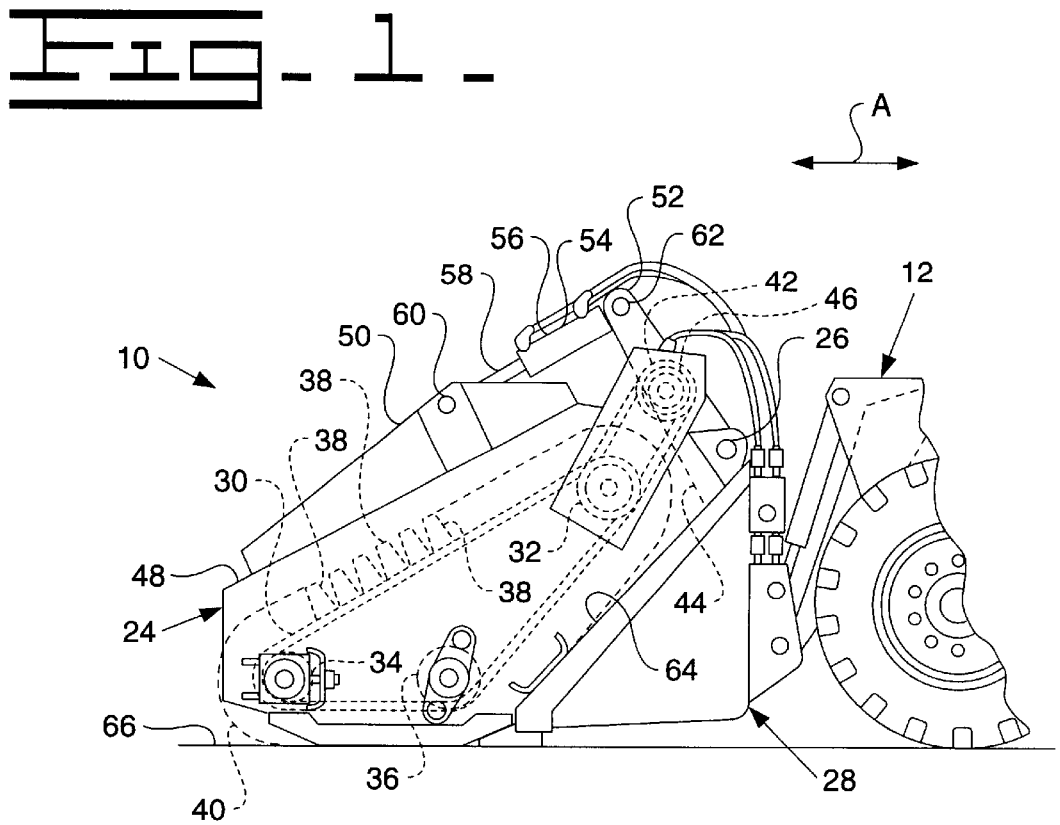
FIG. 1 is a fragmentary side view of a skid steer loader including an improved landscape rake according to the present invention mounted thereto in an operative position.
Figure 2:
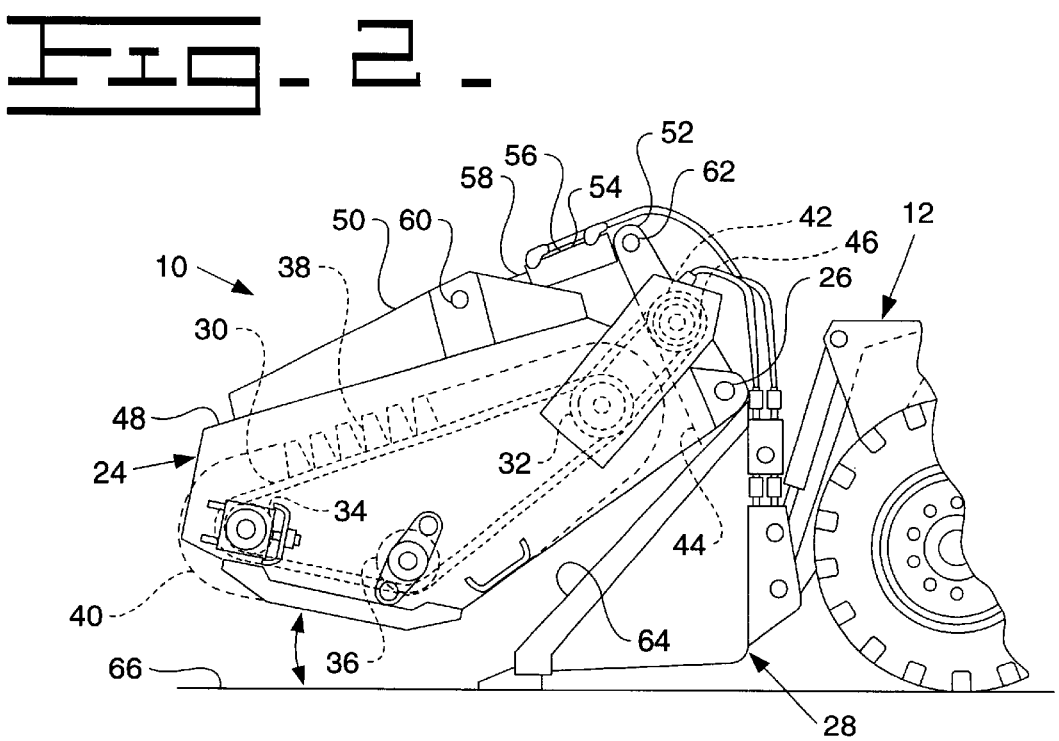
FIG. 2 is another fragmentary side view of the loader of FIG. 1 showing a rake mechanism of the landscape rake in a raised or float position according to the present invention.
Figure 3:
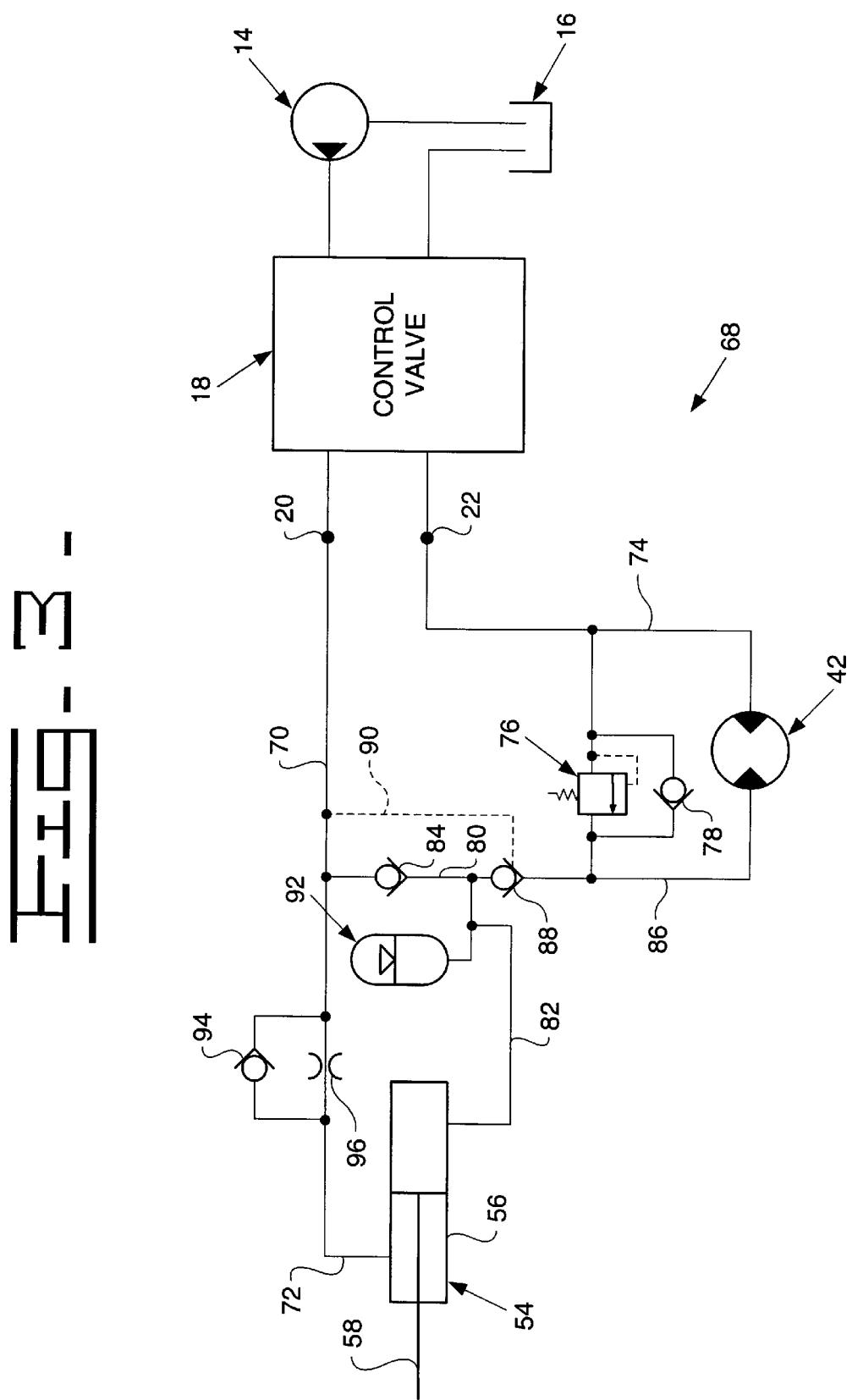
FIG. 3 is a schematic representation of a fluid control system for the landscape rake of FIGS. 1 and 2.

Referring now to the drawings, FIGS. 1, 2 and 3 show aspects of an improved landscape rake 10 constructed and operable according to the teachings of the present invention, operatively mounted in the conventional manner to a work machine 12 representative of a wide variety of conventional work machines, such as, but not limited to, a skid steer loader or a tractor. Work machine 12 includes a conventional power plant and drive train arrangement such as an internal combustion engine and a transmission (not shown) operable for moving work machine 12 in a forward or rearward direction as denoted by arrow A, and a hydraulic system including a source of pressurized fluid such as pump 14 (FIG. 3) driven by the power plant and a fluid receiver 16 (FIG. 3) which can be tank, reservoir, sump or the like. The hydraulic system also includes one or more control valves (18) selectively operable for directing flow of pressurized and unpressurized fluid therethrough and halting fluid flow as generally depicted by control valve 18. Here, control valve 18 is depicted schematically disposed in fluid paths communicating pump 14 and fluid receiver 16 with a pair of hydraulic fittings 20 and 22 adapted for connecting an attachment such as landscape rake 10 in fluid communication with the hydraulic system.

Landscape rake 10 includes a rake mechanism 24 pivotally connected at a pivot joint 26 to a bucket 28. Here, rake mechanism 24 is depicted as a conveyor type mechanism including an endless chain 30 encircling a plurality of sprockets, a drive sprocket 32 and additional sprockets 34 and 36. Chain 30 includes a plurality of spaced teeth 38 which project outwardly from the bottom of rake mechanism 24 as depicted by dashed line 40. Drive sprocket 32 is connected in driven communication with a fluid motor 42 by a second endless chain 44 which encircles drive sprocket shaft 32 and a drive sprocket 46 on an output shaft of fluid motor 42.

Rake mechanism 34 is partially enclosed in a housing 48 including a bracket 50 located in spaced relation to a distal end of a lift arm 52 fixedly mounted to bucket 28. An actuator 54, here a conventionally constructed and operable fluid cylinder 56 having a hydraulically extendable and retractable rod 58, is pivotally connected to bracket 50 and lift arm 52 by pivot joints 60 and 62, respectively.

Fluid cylinder 56 is operable to extend rod 58 for pivoting rake mechanism 24 about pivot joint 26 to a position proximal a front opening 64 of bucket 28 for depositing material therein when rake mechanism 24 is operating, as illustrated in FIG. 1. Conversely, fluid cylinder 56 is operable to retract rod 58 to pivot rake mechanism 24 through a range of open positions spaced from front opening 64, to allow dumping the contents of bucket 28, as illustrated in FIG. 2.

In operation, with rake mechanism 24 positioned proximal to front opening 64 of bucket 28, pressurized fluid will be supplied to fluid motor 42 to rotate chain 30 in a counter clockwise direction when viewed from the side shown in FIGS. 1 and 2. With chain 30 rotating and rake mechanism 24 positioned proximal to front opening 64 of bucket 28, bucket 28 can be articulated in the convention well known manner to bring teeth 38 into contact with a surface such as ground surface 66, and work machine 12 moved in either direction denoted by the arrow A such that teeth 38 will dislodge or rake rocks, plant residue and other desired material from the surface and deposit it into bucket 28 through front opening 64.

When rake mechanism 24 is operating in the above described manner with work machine 13 moving in either direction as denoted by arrow A, from time to time obstacles protruding from or on ground surface 66 will be encountered, such as rocks too large to be raked, attached roots, and other surface irregularities. To avoid damaging rake mechanism 24, particularly teeth 38, it is desirable for rake mechanism 24 to have the ability to float or move relative to bucket 28 when located proximal thereto, so as to be able to pass over such objects and irregularities.

Referring more particularly to FIG. 3, a fluid control system 68 for landscape rake 10 adapted for connection to fittings 20 and 22 of the hydraulic system of work machine 12 is shown. Fluid control system 68 includes a fluid path 70 connecting a rod end port 72 of fluid cylinder 56 to fitting 20, a fluid path 74 connecting an inlet port of fluid motor 42, an inlet port and a signal port of a pressure relief valve 76, and a check valve 78, with fitting 22. A fluid path 80 connects a head end port 82 of fluid cylinder 56 with rod end port 72 and fluid path 70. A check valve 84 is disposed in fluid path 80 to allow flow from head end port 82 to fluid path 70 and rod end port 72, while preventing flow in the opposite direction from fluid path 70 and rod end port 72 to head end port 82. A fluid path 86 is connected at one end to fluid path 80 and head end port 82 and at an opposite end to an outlet port of fluid motor 42, an outlet port of pressure relief valve 76 and check valve 78. A pilot controlled check valve 88 is disposed in fluid path 86 intermediate the connection to fluid path 80 and check valve 78. Check valve 88 has a pilot signal port 90 connected to fluid path 70 and rod end port 72.

Control valve 18 is conventionally selectably operable for supplying pressurized fluid from pump 14 through fitting 20 to fluid path 70 while allowing return flow of fluid through fitting 22 from fluid path 74 to fluid receiver 16. Alternatively, control valve 18 is selectably operable to direct pressurized fluid from pump 14 through fitting 22 to fluid path 74 and to receive fluid from fluid path 70 through fitting 20 and directing that fluid to fluid receiver 16. As still another alternative, control valve 18 is selectably operable in a closed or neutral position to prevent flow between fittings 20, 22 and pump 14 and receiver 16.

When control valve 18 is operated to allow pressurized fluid to flow from pump 14 through fitting 22 to fluid path 74 and return flow from fluid path 70 through fitting 20 to fluid receiver 16, the pressurized fluid will pass through fluid motor 42 to thereby rotate fluid motor 42 to drive chain 30 and operate rake mechanism 24. The fluid discharged from fluid motor 42 will pass through fluid path 86 and pilot control check valve 88. From pilot control check valve 88 the fluid can flow through fluid path 80 into head end port 82 of fluid cylinder 56 or through check valve 84 to fluid path 70. When fluid path 70 is in fluid communication with fluid receiver 16 via valve 18, the fluid from fluid motor 42 can relatively freely flow through check valve 84 to fluid path 70. Because both ports 72 and 82 of cylinder 56 are in communication with fluid receiver 16 via fluid path 70, rod 58 of fluid cylinder 56 will be allowed substantially free movement, to thereby allow rake mechanism 24 to float, the weight of the rake mechanism 24 tending to urge it downwardly toward the position proximal front opening 64 of bucket 28, and contact with fixed obstacles such as rocks too large to rake, large attached roots and surface irregularities, tending to lift the rake mechanism such that damage to teeth 38 and other contact related damage is avoided. This arrangement also eliminates the need for other resilient or cushioning members on or in connection with rod 58, so as to allow direct connection of cylinder 56 to both bracket 50 and arm 52 to provide a cost advantage.

When control valve 18 is operated to allow pressurized fluid to flow from pump 14 through fitting 20 to fluid path 70 and return flow from fluid path 74 through fitting 22 to fluid receiver 16, the pressurized fluid will flow from fluid path 70 through rod end port 72 into fluid cylinder 56 to urge rod 58 to retract. At the same time, the pressurized fluid will flow through pilot signal port 90 to urge open pilot control check valve 88 to allow fluid flow from head end port 82 of fluid cylinder 56 to fluid path 86. From fluid path 86 the fluid can flow through check valve 78 to fluid path 74, and from there through fitting 22 and valve 18 to fluid receiver 16 to allow the retraction of rod 58.

Fluid control system 68 can optionally include fluid accumulator 92 connected to fluid path 80 and head end port 82 for dampening or cushioning shock loads transmitted through the fluid therein, such as when control valve 18 is in its neutral or closed position and work machine 12 is moving between work sites and the like, to prevent damage to the system the other various components of landscape rake 10.

Additionally, fluid control system 68 can include a check valve 94 in rod end port 72 in parallel with a restricted orifice 96, to allow generally free fluid flow through check valve 94 into rod end port 72 and restricted or cushioned flow in the opposite direction.

Industrial Applicability

The improved landscape rake of the present invention has utility for use in a wide variety of applications, including, but not limited to, ground-raking, rock-gathering, debris removing and site leveling tasks. The present landscape rake is additionally adapted for use with a wide variety of work machines, including, but not limited to, loaders such as skid steer loaders, tractors and the like. Although the rake mechanism depicted and described above is of a conveyor type, it should be understood that the present invention is equally well adapted for use with other type rake mechanisms, most notably including drum type units.

By using the fluid arrangement depicted and described herein, a float capability suitable for a wide variety of applications is achieved, importantly, without requiring use of a specially adapted cylinder or other actuator, or additional cushioning hardware for attachment thereof to the rake mechanism, such as springs and the like, thereby eliminating that cost disadvantage.

Additionally, it should be noted that the fluid control system of the present invention can be utilized in association with a wide variety of work machine hydraulic systems in addition to that described herein above.

Other aspects, objects and advantages of the present invention can be obtained from a study of the drawings, the disclosure and the appended claims.

What is claimed is:

1. In a landscape rake including a rotatably operable rake mechanism for performing a raking function, a bucket for receiving material raked by the rake mechanism, and a fluid actuator connected to the rake mechanism operable for moving the rake mechanism relative to the bucket, the fluid actuator having a first port adapted for connection to a source of pressurized fluid for receiving the pressurized fluid therefrom for moving the rake mechanism to a position proximal to the bucket and a second port adapted for connection via a fluid path to a fluid receiver for discharging fluid thereto, the improvement comprising a fluid control system for the fluid actuator including a second fluid path connecting the first port of the fluid actuator with the first named fluid path and a valve disposed in the second fluid path operable for allowing fluid flow therethrough from the first port to the first named fluid path while preventing fluid flow from the first named fluid path to the first port to allow the rake mechanism to float when in the position proximal to the bucket.

2. In the landscape rake of claim 1, the landscape rake further comprising a third fluid path adapted for connecting the first port of the fluid actuator with the fluid receiver, and the improvement further including a valve disposed in the third fluid path operable for allowing fluid flow from the first port to the fluid receiver only when the pressurized fluid is being supplied to the second port.

3. In the landscape rake of claim 2, the valve disposed in the third fluid path is a pilot signal operated check valve.

4. In the landscape rake of claim 1, the improvement further including a fluid accumulator connected in fluid communication with the first port of the fluid actuator.

5. In the landscape rake of claim 1, the improvement further including a restricted orifice disposed between the second port of the fluid actuator and the fluid receiver for throttling fluid flow from the second port to the fluid receiver.

6. In the landscape rake of claim 1, the fluid actuator is a fluid cylinder.

7. In the landscape rake of claim 1, the rake mechanism is a conveyor.

* * * * *